US012464024B2

(12) United States Patent
Mclean et al.

(10) Patent No.: US 12,464,024 B2
(45) Date of Patent: Nov. 4, 2025

(54) SaaS SECURITY CONFIGURATIONS DISTRIBUTION AND MANAGEMENT

(71) Applicant: AppOmni, Inc., San Francisco, CA (US)

(72) Inventors: James Mclean, Washington, DC (US); Brian Soby, Carbondale, CO (US); Harold Byun, Reno, NV (US)

(73) Assignee: AppOmni, Inc., San Francisco, CA (US)

( * ) Notice: Subject to any disclaimer, the term of this patent is extended or adjusted under 35 U.S.C. 154(b) by 125 days.

(21) Appl. No.: 18/334,888

(22) Filed: Jun. 14, 2023

(65) Prior Publication Data

US 2024/0422197 A1    Dec. 19, 2024

(51) Int. Cl.
*H04L 9/40*    (2022.01)
(52) U.S. Cl.
CPC .................................. *H04L 63/20* (2013.01)
(58) Field of Classification Search
CPC ........................................................ H04L 63/20
See application file for complete search history.

(56) References Cited

U.S. PATENT DOCUMENTS

| | | | |
|---|---|---|---|
| 10,628,590 B2 * | 4/2020 | Abukhovsky | G06F 21/577 |
| 10,992,818 B2 * | 4/2021 | Hughes | H04W 4/24 |
| 11,283,840 B2 * | 3/2022 | Murray | G06Q 50/265 |
| 11,418,393 B1 * | 8/2022 | Soby | H04L 63/1441 |
| 11,449,640 B1 * | 9/2022 | Sanders | G06F 21/629 |
| 11,477,280 B1 * | 10/2022 | Irwin | H04L 67/51 |
| 11,494,500 B1 * | 11/2022 | Acharya | G06F 21/602 |
| 11,546,360 B2 * | 1/2023 | Woodford | H04L 63/101 |
| 11,888,870 B2 * | 1/2024 | Garyani | G06F 21/554 |
| 12,041,031 B2 * | 7/2024 | LaChance | H04L 63/029 |
| 2018/0295134 A1 * | 10/2018 | Gupta | H04L 67/56 |
| 2022/0012351 A1 * | 1/2022 | Sanders | G06F 21/577 |
| 2022/0116397 A1 * | 4/2022 | Deshmukh | H04L 63/102 |
| 2022/0147637 A1 * | 5/2022 | Melamed | G06F 21/6218 |
| 2022/0166789 A1 * | 5/2022 | Murray | H04L 63/1416 |
| 2022/0191251 A1 * | 6/2022 | Gavish | H04L 63/108 |
| 2023/0171281 A1 * | 6/2023 | Gorin | H04L 67/535 726/25 |
| 2024/0022604 A1 * | 1/2024 | Radhakrishnan | H04L 63/20 |

* cited by examiner

*Primary Examiner* — Viral S Lakhia
(74) *Attorney, Agent, or Firm* — Van Pelt, Yi & James LLP

(57) ABSTRACT

SaaS security configurations distribution and management are disclosed, including: providing first software as a service (SaaS) security configurations for a first organization that are applicable to the first organization based at least in part on first attributes of the first organization, wherein the first SaaS security configurations trigger first security actions upon detection of first relevant events; providing second SaaS security configurations for a second organization that are applicable to the second organization based at least in part on second attributes of the second organization, wherein the second SaaS security configurations trigger second security actions upon detection of second relevant events; and selectively presenting, at a user interface, at least a portion of the second SaaS security configurations that is applicable to the first organization based at least in part on the first attributes of the first organization.

20 Claims, 7 Drawing Sheets

SaaS SECURITY CONFIGURATIONS DISTRIBUTION AND MANAGEMENT

BACKGROUND OF THE INVENTION

Conventionally, security-based rules are shared among entities in a haphazard manner, such as over email or across web-based forums. However, such forms of sharing are not trustworthy, reliable, or consistent. Additionally, an entity that is browsing through shared rules in this way cannot be assured that the rules are relevant to their security concerns.

BRIEF DESCRIPTION OF THE DRAWINGS

Various embodiments of the invention are disclosed in the following detailed description and the accompanying drawings.

DETAILED DESCRIPTION

Figure 1:
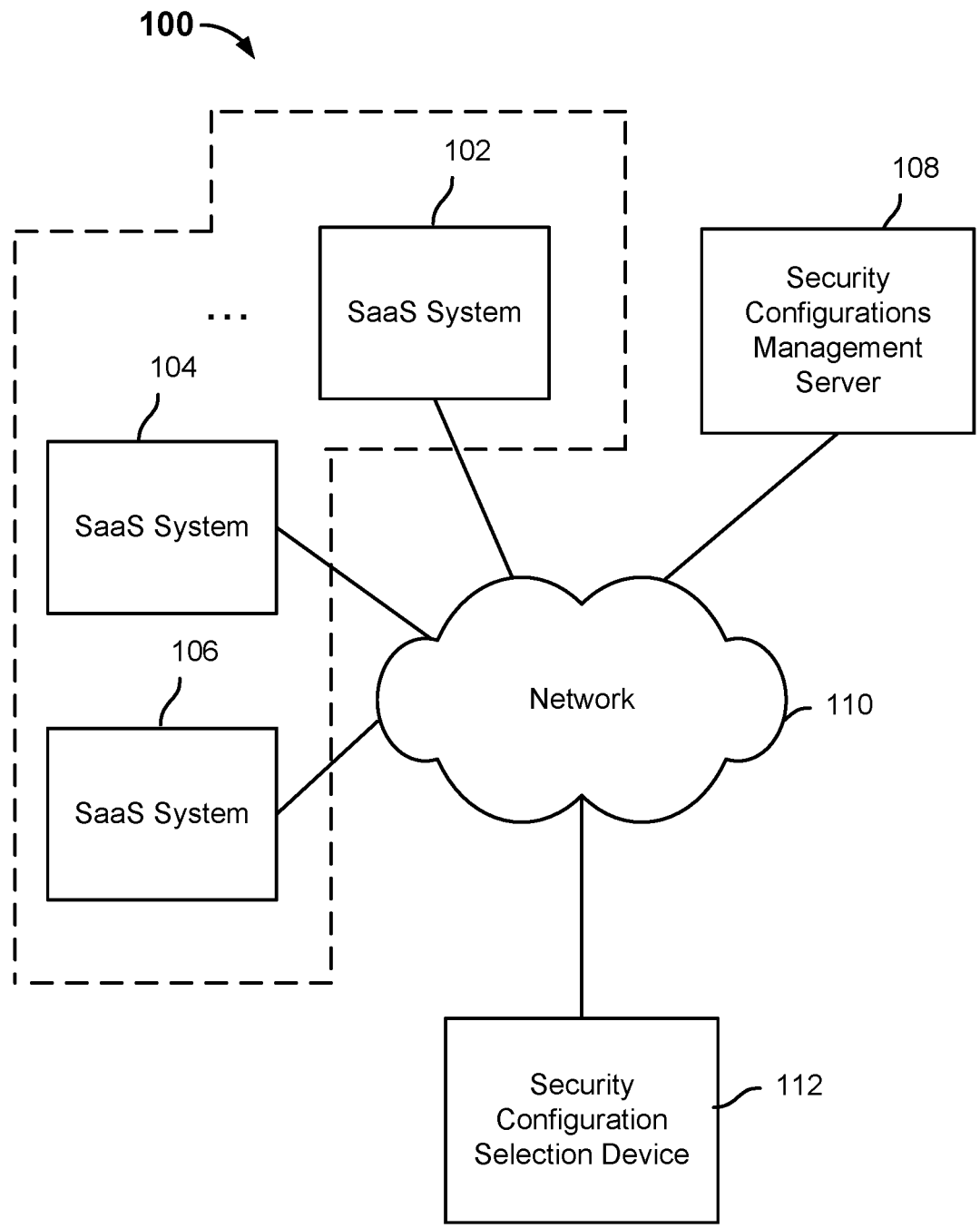
FIG. 1 is a diagram showing an embodiment of a system for SaaS security configurations distribution and management.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Embodiments of software as a service (SaaS) security configurations distribution and management are described herein. First SaaS security configurations are provided by a security configurations management server for a first organization based at least in part on first attributes of the first organization. Examples of an SaaS "security configuration" include a detection rule, a policy, a managed list, and a prescribed setting with respect to an organization's stored data at or events received from an SaaS platform. Examples of "attributes" of an organization include identifying information of which SaaS platforms to which the organization subscribes services, which existing security configurations are currently enforced for the organization, the industry that the organization is in, the language setting(s) that are set for the organization, and which software or product licenses the organization currently has. For example, the existing SaaS security configurations that are enforced for the first organization could be created by the first organization and/or created by a third-party service and then adopted by/subscribed to the first organization. A first security configuration could be enforced for the first organization by the security configurations management server evaluating that security configuration against the first organization's data stored at or events received from a relevant SaaS platform that provides a service that the first organization subscribes to. As a consequence of evaluating the first security configurations against the first organization's data stored at or events received from SaaS platforms, the security configurations management server could trigger security actions such as, for example, performing remediations at the SaaS platforms on behalf of the first organization and/or exposing detected rule violations or detected discrepancies at a user interface. Second SaaS security configurations are provided by the security configurations management server for a second organization based at least in part on second attributes of the second organization. A second security configuration could be similarly enforced for the second organization by the security configurations management server evaluating that security configuration against the second organization's data stored at or events received from a relevant SaaS platform that provides a service that the second organization subscribes to. The second security configurations that are currently applied to the second organization are evaluated in light of the first attributes of the first organization to select a subset that is also applicable to the first organization. For example, a security configuration can be determined to "apply" to an organization if the organization subscribes to the SaaS platform to which the security configuration is relevant and/or has the appropriate licensing. The selected subset of second security configurations are then presented at a user interface for the first organization, such that an actor (e.g., a user) associated with the first organization can select to subscribe to/adopt a presented security organization to install and be enforced by the security configurations management server for the first organization.

FIG. 1 is a diagram showing an embodiment of a system for SaaS security configurations distribution and management. As shown in FIG. 1, system 100 includes SaaS system 102, SaaS system 104, SaaS system 106, security configurations management server 108, network 110, and security configuration selection device 112. Network 110 may be implemented using high-speed telecommunications and/or data networks. Each of SaaS system 102, SaaS system 104, SaaS system 106, security configurations management server 108, and security configuration selection device 112 may communicate over network 110.

Each of SaaS system 102, 104, and 106 is associated with a respective SaaS platform and is configured to provide a respective service and also generate events that document activities (e.g., user activity) that occur with respect to their services/function. For example, each event includes one or more of the following: an event timestamp associated with when a corresponding activity occurred and/or when the event was generated, a unique identifier for the event, a field that identifies one or more users associated with the activity, a field that identifies an organization associated with the activity, and one or more fields that describe attributes of the activity. Examples of services provided by SaaS platforms include workflow management, file storing, file sharing, customer relationship management, payroll management, employee data management, human resource data management, and financial management. For example, organizations such as enterprises may subscribe to services provided by one or more SaaS platforms to help manage their businesses. As activities are performed by users (e.g., employees, contractors, customers, and/or guests) associated with an organization that subscribes to the services provided by an SaaS system (e.g., such as one of SaaS systems 102, 104, and 106), the SaaS system is configured to generate corresponding events that document such activities. Some examples of activities that are documented by events include login attempts into the SaaS platform, a checking out of a file, a change of a setting, a change of the value of a field, a transfer of funds to an account, and a change of a user's permissions with respect to a set of files.

Security configurations management server 108 is configured to manage, distribute, and enforce security configurations across one or more organizations. For example, each such organization is a "customer" or "tenant" of security configurations management server 108. Security configurations management server 108 is configured to store attributes corresponding to each organization. Examples of attributes that security configurations management server 108 can store for each organization may include one or more of the following: which SaaS platforms the organization subscribes to, the organization's current configurations at each SaaS platform (e.g., which roles are permitted which types of accesses to which data values at each SaaS platform), the organization's currently installed security configurations (e.g., with respect to one or more SaaS platforms), the organization's industry type, the organization's current software and product licenses, and any types of legal compliances that are required of the organization.

Security configurations management server 108 is configured to store, for each organization, the existing SaaS security configurations that are enforced for that organization. In various embodiments, a "security configuration" includes, but is not limited to, a detection rule, a policy, a managed list, and a setting with respect to an organization's configuration at an SaaS platform. In some embodiments, a "detection rule" comprises one or more conditions that if met by events occurring at a relevant SaaS platform, then a prescribed security action will be performed. Also, for example, a detection rule may comprise a sequence of member rules (which are sometimes referred to as "building block rules") such that if the rules are triggered in the sequence specified in the detection rule, then a further prescribed security action will be performed (e.g., in addition to any security actions that may have been taken in response to the member rules being triggered). In some embodiments, a "policy" includes identifying information associated with a set of actors (e.g., user roles) and specified prescribed security attributes (e.g., which level of permissions, if any, each type of actor can have for a set of the organization's files at the SaaS platform) for the actors at an SaaS platform such that if the actors' actually configured security attributes at the SaaS platform do not match the prescribed security attributes that are specified in the policy, then a prescribed security action will be performed. In some embodiments, a "managed list" comprises either a blacklist or whitelist of actors or third parties against which accesses should be or respectively denied or permitted, depending on the type of list they were on. In various embodiments, a "setting" with respect to an organization's configuration at an SaaS platform is a specified setting, value, mode, option, and/or selection that should be configured for the organization at the SaaS platform and in the absence of, a prescribed security action is to be performed. Security configurations management server 108 is configured to enforce the security configurations for an organization by evaluating the security configurations against that organization's events and/or data stored at one or more SaaS platforms (e.g., after connecting to the SaaS platforms using credentials associated with the organization).

In various embodiments, an organization adopts security configurations that are enforced by security configurations management server 108 by generating/configuring its own security configurations and/or by subscribing to security configurations that are shared by other entities. In various embodiments, an entity (e.g., an organization for which security configurations management server 108 enforces security configurations or a third-party service, such as a global service integrator) can also share/publish the security configurations that it has configured with (other) organizations so that (other) organizations can select/subscribe to/adopt security configurations that are relevant to the SaaS platform(s) from which they subscribe services. In some embodiments, in response to an organization or other entity's request to share/publish a particular security configuration, security configurations management server 108 is configured to identify fields within the security configuration that need to be customized for a subscriber organization. For example, fields within the security configuration that reference the publisher organization's specific data would need to be modified/customized for each organization that chooses to subscribe to the security configuration. In some embodiments, fields within a shared/published security configuration that are either identified by the sharing entity or security configurations management server 108 as needing to be customized by an organization that subscribes to the security configuration (e.g., this organization is sometimes referred to as a "subscriber organization") are sometimes referred to as "placeholder fields." Security configurations management server 108 is configured to store a status data corresponding to each security configuration that is published along with metadata such as, for example, the publication parameters (e.g., whether the security configuration should be published with or without attribution to the publisher, which types of organizations are permitted to subscribe to the security configuration, an expiration date for the security configuration, etc.).

In various embodiments, security configurations management server 108 is configured to receive a request to subscribe to shared/published security configurations from security configuration selection device 112. For example, security configuration selection device 112 comprises a tablet device, a smart phone, a laptop computer, a desktop computer, or any networked device. While only one instance of security configuration selection device 112 is shown in FIG. 1, in actual practice, more than one instance of security configuration selection device 112 can be used to access the security configuration management services provided by security configurations management server 108. For example, security configuration selection device 112 is operated by a (e.g., administrative) user at an organization for which security configurations management server 108 manages and enforces security configurations. For example, an organization, for which security configurations management server 108 already manages and enforces security configurations, may seek to subscribe to/adopt additional security configurations (e.g., that were generated by and/or subscribed to by similar organizations for which security configurations management server 108 manages and enforces security configurations). For example, a user may access a login to a website provided by security configurations management server 108 using credentials associated with the associated organization and select an interactive element for requesting to browse shared/published security configurations that are applicable to that organization. In response to such a request to view shared/published security configurations that are applicable to a given organization, security configurations management server 108 is configured to evaluate the security configurations that have been shared/published by other organizations and entities to determine the subset that is relevant/applicable to the requesting organization to present at a user interface to be provided to security configuration selection device 112.

For a given organization that requests to browse through relevant security configurations, security configurations management server 108 is configured to evaluate the pool of published security configurations against the stored information associated with a given organization, such as, for example: the attributes of the given organization, the existing security configurations that are being enforced by security configurations management server 108 for the given organization, and/or the one or more SaaS platforms from which the given organization currently receives services. In some embodiments, security configurations management server 108 is configured to compare each published security configuration against the stored information associated with the given organization to determine whether at least a portion of the security configuration can be implemented for the given organization. For example, security configurations management server 108 is configured to determine whether at least a portion of the published security configuration can be implemented for the given organization if the SaaS platforms against which a published security configuration is to be enforced includes at least one to which the given organization subscribes, if the product and/or software licenses that are required/appropriate to enforce the security configuration are possessed by the given organization, if at least a portion of the security configuration is still valid (e.g., not expired), and/or if the security configuration is redundant or in conflict with an existing security configuration that is currently enforced for the given organization. Security configurations management server 108 is configured to identify the selected subset of published security configurations that can be implemented for the given organization and then present information on the selected security configurations in a user interface that a user of that given organization can browse through and select zero or more of which to implement by security configurations management server 108 for the given organization. Because different organizations would have a different combination of attributes, existing security configurations, and SaaS platform(s) that they subscribe to, the security configurations that security configurations management server 108 is to determine as applicable would be customized for each organization and differ from organization to organization.

A user of security configuration selection device 112 is configured to browse, at a user interface, the select group of published security configurations that security configurations management server 108 has determined as being relevant to the given organization. The user could then select zero or more such presented security configurations to subscribe to/adopt/install for the associated organization. In some embodiments, selected security configurations can be installed for the given organization by applying or overlaying that security configuration with that organization's security configuration storage. In some embodiments, at install time, security configurations management server 108 is configured to determine whether a security configuration that has been selected for installation includes any placeholder fields that should be customized for the subscriber organization. As mentioned above, placeholder fields in a published security configuration can be designated as such by the publisher entity and/or by security configurations management server 108. In the event that a security configuration that is selected for installation includes a portion that is not applicable/enforceable/relevant to the subscriber organization, then only the remaining portion that is relevant can be installed for that organization. Once a selected security configuration has been installed for the subscriber organization, security configurations management server 108 is configured to enforce that security configuration on behalf of the organization by evaluating the configuration against the organization's configurations at the relevant SaaS platform(s) to which the organization subscribes.

Over time, as at least portions of subscribed to/adopted security configurations expire or are modified by its publisher, security configurations management server 108 may no longer enforce the expired security configurations or enforce updated versions of the security configurations that no longer apply to the respective subscriber organizations.

As described in FIG. 1, various embodiments described herein enable the distribution of security configurations among organizations (and other types of publishers of security configurations) (e.g., customers) of security configurations management server 108, which already provide the enforcement of security configurations for the organizations against the organizations' data stored at or events received from SaaS platforms that they subscribe to. As such, security configurations management server 108 acts as a hub for similarly situated organizations (e.g., customers) to seamlessly adopt/subscribe to new security configurations (e.g., that have already been helpful to some organizations) that are originated from their peers and also enforce the adopted new security configurations for such organizations. An organization can trust that published security configurations that they select to adopt will be compatible for them because security configurations management server 108 has already vetted the security configurations prior to making available options available for their selection based on security configurations management server 108's knowledge/history of monitoring the organization's activities with respect to SaaS platforms.

Figure 2:
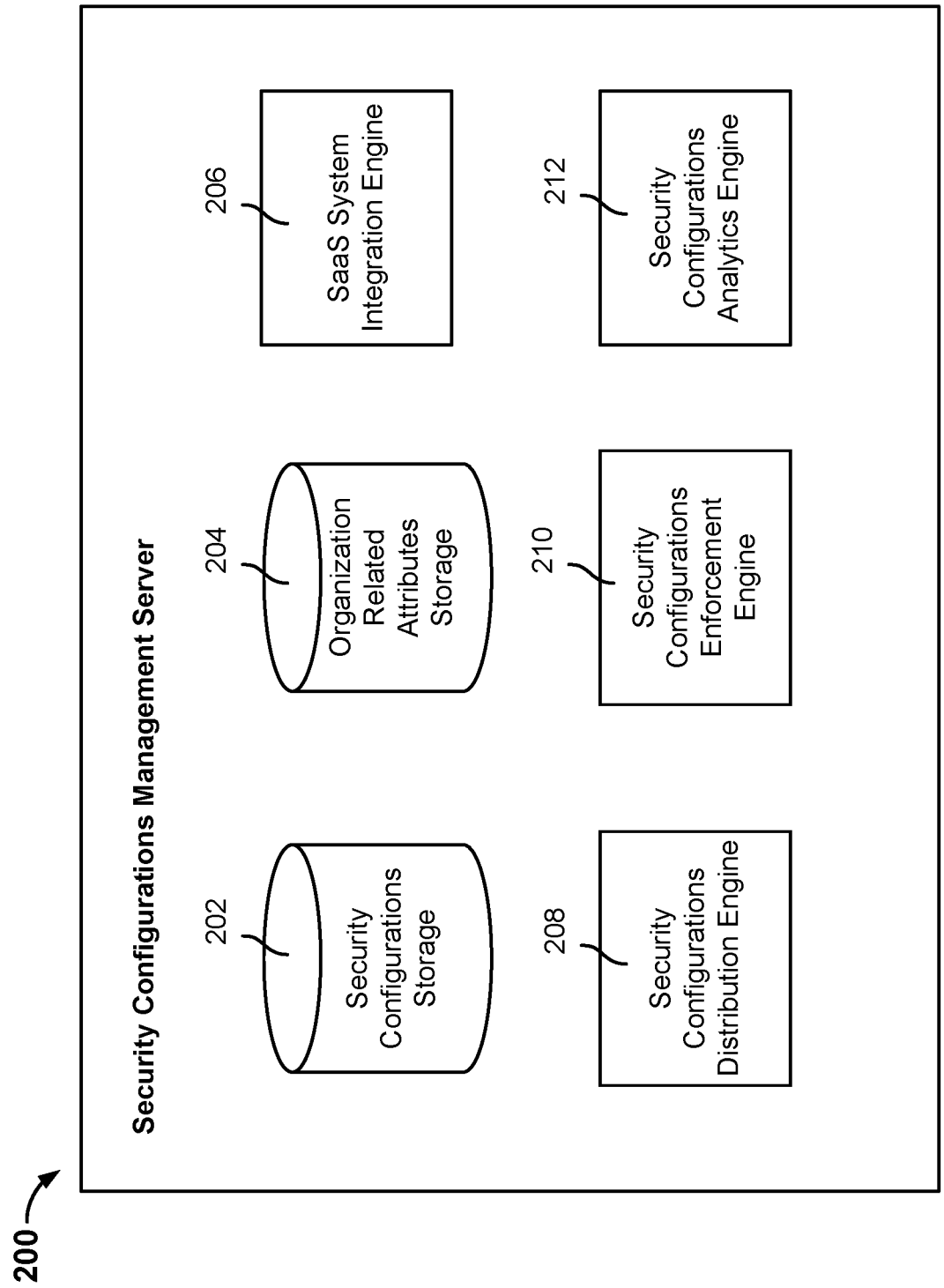
FIG. 2 is a diagram showing an example of a security configurations management server in accordance with some embodiments.

FIG. 2 is a diagram showing an example of a security configurations management server in accordance with some embodiments. As shown in FIG. 2, the example of security configurations management server 200 includes security configurations storage 202, organization related attributes storage 204, SaaS system integration engine 206, security configurations distribution engine 208, security configurations enforcement engine 210, and security configurations analytics engine 212. Each of security configurations storage 202, organization related attributes storage 204, SaaS system integration engine 206, security configurations distribution engine 208, security configurations enforcement engine 210, and security configurations analytics engine 212 may be implemented using software and/or hardware.

Security configurations storage 202 is configured to store published security configurations. As mentioned above, examples of a "security configuration" include a detection rule, a policy, a managed list, and a setting with respect to an organization's configuration at an SaaS platform. Each published security configuration is associated with metadata such as publication parameters that are provided by the publishing entity. In various embodiments, publication parameters are parameters in which the published security configuration can be shared with a subscriber organization. In a first example, the publication parameters of a published security configuration can designate that one or more fields within the security configuration are placeholder fields and that should be programmatically customized either by the security configuration management server or manually customized by a subscriber organization (e.g., at subscription or installation time). In a second example, the publication parameters of a published security configuration can include that the security configuration should be shared privately to specified organizations. In a third example, the publication parameters of a published security configuration can include that the security configuration can be shared publicly with any organization. In the event that the security configuration is to be shared publicly, the security configuration can be published to a marketplace of security configurations, and the publisher could indicate whether and how much information about the publisher is to be distributed with the security configuration. For example, for a publicly shareable security configuration, its publication parameters can indicate whether to publish identification information associated with the publisher (e.g., the name of the publisher, the size and/or industry of the publisher, whether the publisher is an organization/customer of a security configurations management server, or the whether the publisher is a partner of the security configurations management server such as a global service integrator (GSI)), whether the identity of the publisher is to remain anonymous, whether the subscription to the security configuration involves a fee, whether the computer program code associated with the security configuration is permitted to be viewed/shared (e.g., in a limited or open manner), and/or whether the security configuration can be modified/cloned by a subscriber organization. In some embodiments, published security configurations can be cryptographically signed by their respective publishers to authenticate the publishers to the security configurations management server and/or the subscriber organizations. In some embodiments, some published security configurations each include an expiration date corresponding to at least a portion of the configurations. At least some of the stored published security configurations include placeholder fields that are to be customized specifically for each organization that selects to subscribe to such a security configuration.

Security configurations storage 202 is further configured to store instances of security configurations that are currently subscribed to/adopted by one or more organizations. Each instance of a security configuration that is stored by security configurations storage 202 was customized, if appropriate, for the organization that had adopted/subscribed to it either at subscription time or at installation time. For example, customizing a security configuration includes to replace a placeholder field within a security configuration with a value that is specific to the subscriber organization. One example type of placeholder field that can be programmatically replaced/updated with an organization's own values is a field for an authorized IP address that can be updated from a list of IP addresses that have been authorized by the organization. In some embodiments, at installation time, a placeholder field in a security configuration can be programmatically replaced by the security configurations management server with a value specific to the subscriber organization based on metadata associated with the placeholder field. In some embodiments, the security configurations that have been configured by and/or subscribed to by an organization are stored in a respective data store corresponding to that organization.

Organization related attributes storage 204 is configured to store attributes corresponding to each organization (e.g., that is a customer of and) for which the security configurations management server is configured to store, distribute, and/or enforce security configurations. As mentioned above, examples of "attributes" of an organization include which SaaS platforms to which the organization subscribes services, which security configurations (e.g., that are stored in security configurations storage 202) are currently enforced for the organization, the industry of the organization, the language setting(s) that are set for the organization, and which software or product licenses the organization currently has. In some embodiments, when an attribute of an organization is updated, the organization's stored attributes are correspondingly updated and similarly, any existing security configurations that are associated with that organization can be checked against the updated attributes to determine whether one or more of such existing security configurations no longer apply to the organization and therefore should not be enforced for that organization.

SaaS system integration engine 206 is configured to connect to systems associated with SaaS platforms to access organizations' data that have been stored at those SaaS platforms (e.g., using credentials or an integration connection that had been previously presented by the organizations). Examples of an organization's data that has been stored at an SaaS platform include stored data, processed data, detected data, identified data, configuration, compliance or auditing-supporting elements, and user or administrative log events. Other examples of an organization's data that has been stored at an SaaS platform include a privileged type, a permission type, or an access type corresponding to stored underlying values. For each organization (e.g., that is a customer of the security configurations management server), SaaS system integration engine 206 is configured to use the application programming interface (API) corresponding to each SaaS platform from which the organization subscribes to services to update a data value on the behalf of the organization at the SaaS platform, read a current/existing data value belonging to the organization at the SaaS platform, and receive security-related events (e.g., login events) related to the organization (e.g., such as events that describe which users associated with the organization have logged into their account with the SaaS platform). In some embodiments, SaaS system integration engine 206 is configured to normalize security-related events received from different SaaS platforms according to a uniform schema such that the normalized events share a uniform format but maintain their original field values. The normalized events can then be evaluated (e.g., by security configurations enforcement engine 210) against each organization's respective existing security configurations (e.g., detection rules).

Security configurations distribution engine 208 is configured to distribute published security configurations to requesting organizations. In various embodiments, security configurations distribution engine 208 receives a request from a user associated with an organization (e.g., an organization) for which security configurations management server 200 already stores and enforces security configurations. In response to the request, in some embodiments, security configurations distribution engine 208 is configured to evaluate published security configurations (e.g., that are stored at security configurations storage 202) against the requesting organization's attributes (e.g., that are stored at organization related attributes storage 204) and the existing security configurations that have been subscribed to/adopted by the organization (e.g., as denoted in security configurations storage 202). For example, security configurations distribution engine 208 will identify the published security configurations that are not in conflict with or are redundant relative to the requesting organization's existing security configurations. Then, among those identified published security configurations, security configurations distribution engine 208 is configured to determine a subset that is relevant to the requesting organization given the requesting organization's attributes and currently subscribed-to SaaS platforms. Optionally, security configurations distribution engine 208 can then prioritize/rank these remaining published security configurations based on collected analytics (e.g., as determined by security configurations analytics engine 212) such as the publishers' rates of subscriptions, the velocity at which the security configurations are triggered, the publishers' ratings, and the history of subscriptions by the organization. Security configurations distribution engine 208 can then present the (optionally ranked) selected subset of published security configurations that are relevant to the requesting organization at a user interface that is presented to users of that organization. In some embodiments, this user interface also includes information corresponding to each published security configuration that is determined based on the publication parameters of that configuration. The resulting user interface includes only the published security configurations that have been determined to be applicable to the requesting organization given the security configurations management server's stored information on the organization and integration with the organization's SaaS platform accounts. The security configurations that are presented at the user interface are also known to be compatible with/enforceable by the security configurations management server on the organization's behalf (e.g., because they have already been enforced by the security configurations management server with respect to at least one other organization/customer). The published security configurations that are not relevant to the requesting subscriber are not presented at/hidden from the user interface.

Security configurations enforcement engine 210 is configured to enforce each security configuration that has been adopted by/subscribed to by each organization. In some embodiments, security configurations enforcement engine 210 comprises a respective interface that is configured to access each organization's respective data store to enforce that organization's store security configurations. In various embodiments, security configurations enforcement engine 210 is configured to enforce a security configuration for an organization by comparing the condition(s) of the security configuration against data value(s) stored at and/or event(s) received from one or more SaaS platforms that are specified in the security configuration. For example, security configurations enforcement engine 210 can (e.g., periodically) compare the organization's data values stored at an SaaS platform to the condition(s) of a security configuration. Also, for example, security configurations enforcement engine 210 can compare the organization's security-related events that have been received from the SaaS system via SaaS system integration engine 206 to the condition(s) of the security configuration. If the security configuration's specified condition(s) are met by data values stored at/events received from the specified SaaS platform, then security configurations enforcement engine 210 is configured to perform a security action that is prescribed by the triggered security configuration. For example, a security action comprising a policy that indicates that a specified access permission should be configured for a specified directory of files for administrative users at SaaS platform ACME will be triggered if at least one administrative user does not have the specified access permission for that specified directory of files at SaaS platform ACME. The corresponding security action that is indicated by the policy could be to send/present an alert at a user interface for users of the organization and/or to execute computer code to cause API calls to be made to SaaS platform ACME to modify the administrative users' access permissions with respect to that directory of files to match the one specified in the policy.

Security configurations analytics engine 212 is configured to determine analytics with respect to publishers of security configurations and published security configurations. In some embodiments, security configurations analytics engine 212 is configured to receive reviews/feedback from subscriber organizations of published security configurations and therefore, security configurations analytics engine 212 is configured to determine a rating based on such feedback with respect to the publisher and/or security configurations published by that publisher. In some embodiments, security configurations analytics engine 212 is configured to determine benchmarking for a published security configuration based on the number of organizations that have subscribed to the security configuration (e.g., across all industries or within specific industries). In some embodiments, security configurations analytics engine 212 is configured to determine the velocity for a published security configuration based on the number of times that the security configuration had been triggered over a given period of time. As mentioned above, the analytics that have been determined for a publisher and/or individually published security configurations can be presented with the security configurations for a browsing user and/or can be used to rank the security configurations prior to presenting them at a user interface for a browsing user.

Figure 3:
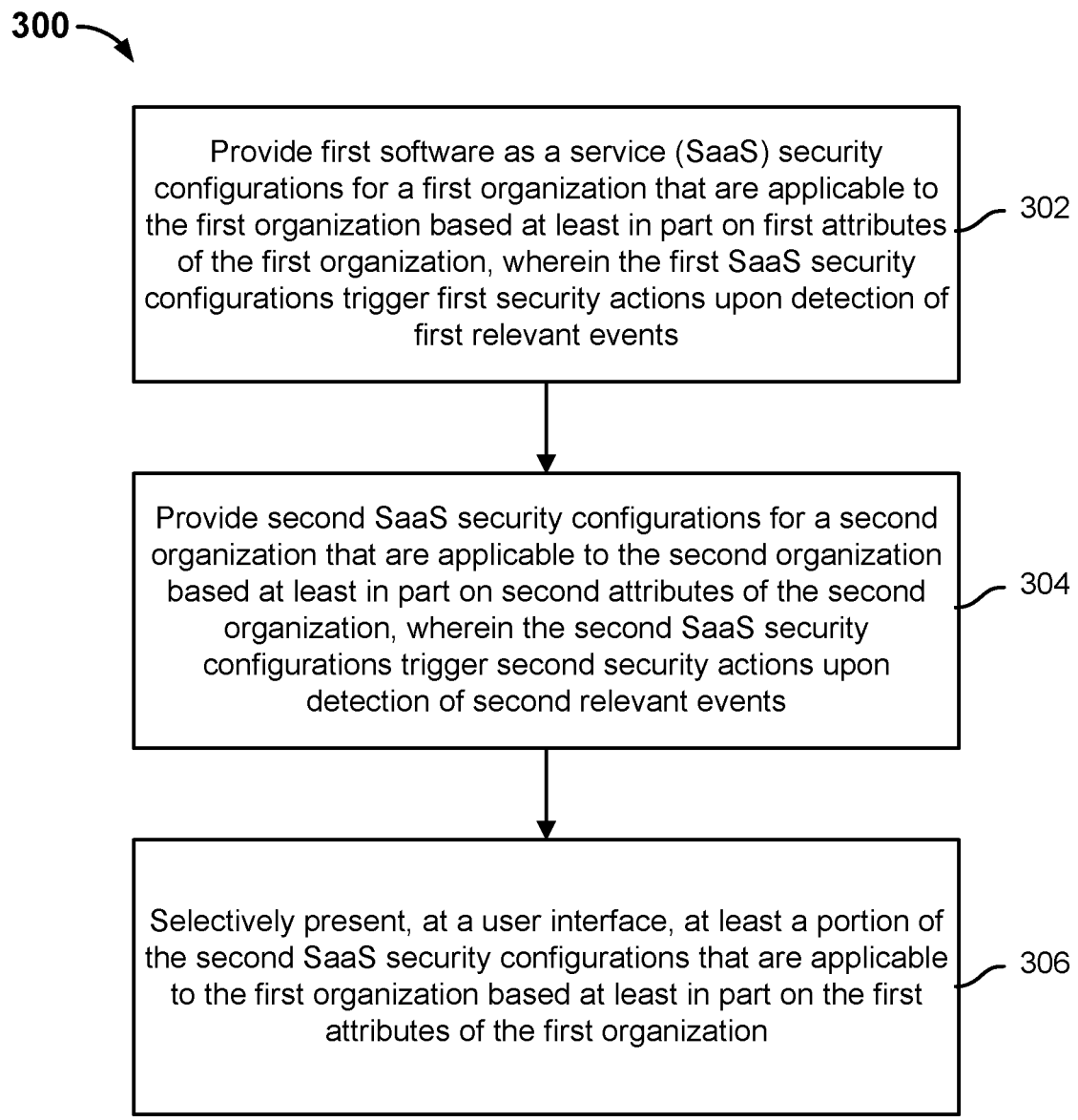
FIG. 3 is a flow diagram showing an embodiment of a process for distributing and managing security configurations.

FIG. 3 is a flow diagram showing an embodiment of a process for distributing and managing security configurations. In some embodiments, process 300 is implemented at security configurations management server 108 of system 100 of FIG. 1.

At 302, first software as a service (SaaS) security configurations that are applicable to a first organization based at least in part on first attributes of the first organization are provided for the first organization, wherein the first SaaS security configurations trigger first security actions upon detection of first relevant events. Examples of an SaaS security configuration include a detection rule, a policy, a managed list, and a setting with respect to an organization's configuration at an SaaS platform. Security configurations that have been determined to be applicable to a first organization due to the first organization's attributes and the SaaS platforms that the first organization subscribes to are enforced for the first organization. The security configurations are enforced for the first organization by evaluating the first organization's stored data values at and/or security-related events that are received from the SaaS platforms at which the first organization has subscriptions against the conditions described in the security configurations. If a condition in a security configuration is met, then the security action that is prescribed in that security configuration is performed. For example, performing a security action may include presenting, at a user interface, detected discrepancies between the prescribed access permission for a given user and the actual access permission for that given user at a specified SaaS platform. In a second example, performing a security action may include executing a computer code snippet to make an API call to modify a data value at a specified SaaS platform to confirm to a prescribed data value on behalf of the first organization.

At 304, second SaaS security configurations that are applicable to a second organization based at least in part on second attributes of the second organization are provided for the second organization, wherein the second SaaS security configurations trigger second security actions upon detection of second relevant events. Security configurations that have been determined to be applicable to a second organization due to the second organization's attributes and the SaaS platforms that the second organization subscribes to are enforced for the second organization, similar to how security configurations that are applicable to the first organization are enforced for the first organization, as described above.

At 306, at least a portion of the second SaaS security configurations that are applicable to the first organization based at least in part on the first attributes of the first organization is selectively presented at a user interface. In some embodiments, the security configurations that have been enforced for the second organization become published (e.g., by the second organization or whichever entity that had generated the security configurations) such that other organizations are eligible to subscribe to and install such security configurations. In the event that a user associated with the first organization requests to browse published security configurations that are candidate ones for the first organization to adopt, the security configurations management server is configured to evaluate published security configurations against at least the attributes of the first organization to determine the subset that is relevant/applicable to the first organization. The subset of published security configurations is then presented at a user interface for a user of the first organization such that the user can select one or more of such security configurations for the first organization to subscribe to. Put another way, security configurations that do not apply to the first organization are hidden or excluded from the user interface of applicable published security configurations that is shown to user(s) of the first organization. Security configurations that will never be triggered given the first organization's attributes are examples of those that do not apply to the first organization. After the user of the first organization selects to subscribe to a security configuration, the security configurations management server is configured to enforce the subscribed-to security configuration for the first organization.

Figure 4:
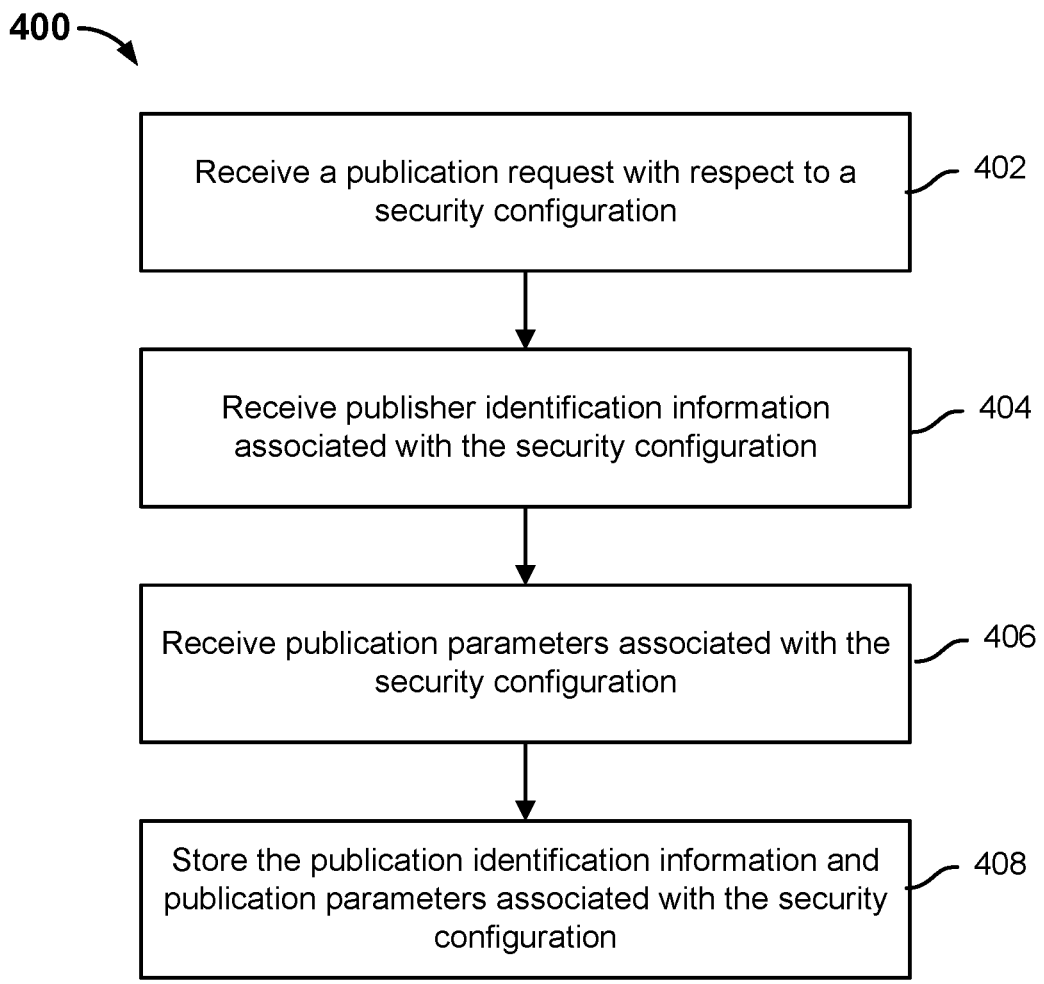
FIG. 4 is a flow diagram showing an example of a process for requesting the publication of a security configuration in accordance with some embodiments.

FIG. 4 is a flow diagram showing an example of a process for requesting the publication of a security configuration in accordance with some embodiments. In some embodiments, process 400 is implemented at security configurations management server 108 of system 100 of FIG. 1.

Process 400 describes an example process of storing information associated with a request to publish/share a security configuration from a publisher. For example, the publisher could be a first organization (e.g., customer) or a partner of the party that operates the security configurations management server.

At 402, a publication request with respect to a security configuration is received. For example, the security configuration was configured by the requestor. If the publication requestor were an organization, then the security configuration could have been configured by the organization to address a security concern it had and/or in response to updated security practices that the organization is aware of.

At 404, publisher identification information associated with the security configuration is received. Information about the publication requestor may include, for example, the name of the publisher, the industry of the publisher, and the language that is primarily used by the publisher, for example.

At 406, publication parameters associated with the security configuration are received. Publication parameters may be indicated by the publication requestor. For example, publication parameters may indicate whether the security configuration should only be privately shared with a specified set of organizations or publicly shared with any organization for which the security configuration is relevant. Also, publication parameters can determine whether the security configuration will identify the publisher and/or an abstracted/anonymized version of the publisher's identity. Furthermore, publication parameters can determine whether subscription to the security configuration is associated with a cost and if so, how much. Additionally, publication parameters can determine whether a subscriber can have a limited or open view of the computer code behind the security configuration and whether the subscriber can modify or clone the security configuration. In some embodiments, the publisher may provide a digital/cryptographic signature along with the security configuration to provide authentication of the publishing entity.

At 408, publication identification information and publication parameters associated with the security configuration are stored. In some embodiments, at publication time, it is determined whether the published security configuration includes any placeholder fields that are expressly indicated by the publisher to need to be later customized for a subscriber organization. Also, at publication time, the security configurations management server can also review the security configuration to determine any fields that are specific to (e.g., specifically reference data belonging to) the publisher and replace them with placeholder fields that are to be later customized for a subscriber organization.

The following are example types of SaaS security configurations:

Detection rules. An SaaS security configuration can be any type of detection rule. Example types of detections include condition rules, threshold rules, state-change rules, and sequence rules. A condition rule causes an alert to be generated in response to the presence of certain conditions in an event. For example, a condition rule can dictate to send an alert when a user has disabled two-factor authentication at a specified SaaS platform. A threshold rule is made up of a condition rule with one or more alert generation conditions: a threshold of how many influencing events that meet the condition are required to trigger an alert, and a timeframe which is the window of time in which the threshold of influencing events must trigger within. For example, a threshold rule can be used to detect if a user has five failed login attempts within the past ten minutes. A state-change rule compares the current state of an event to the prior state of an earlier event. For example, a state-change rule can determine the difference between the origin location of two values/states of two (e.g., adjacently/sequentially occurring) login events at a specified SaaS platform as f(x,y) using condition functions in the condition rule. A sequence rule specifies a list of non-sequence rules (e.g., conditions rules, threshold rules, state-change rules) to describe complex alerting conditions. For example, a sequence rule can detect whether multiple failed login attempts at an SaaS platform were followed by a successful login from a foreign internet protocol (IP) address. In another example, a sequence rule can detect whether a change being made to the routing number (or other account identifying information) of a payee was followed by a payment being sent to that payee.

Policies. A policy includes a set of mappings to elements stored at one or more specified SaaS platforms, a set of prescribed configurations (e.g., security settings/permissions/privileges), and a selected set of actors. If one of the actors specified by the policy does not have the prescribed type of configuration with respect to the specified elements at a specified SaaS platform, then a prescribed security action can be performed.

Managed Lists. A first example of a managed list is a white list (e.g., a list of Internet Protocol (IP) addresses or a list of users). For example, a white list identifies identities of users/devices/applications/services with which an organization can access (e.g., via an SaaS platform). If an event indicates that an access was made to an entity that is not on a white list, then a prescribed security action can be performed. A second example of a managed list is a black list (e.g., a list of Internet Protocol (IP) addresses or a list of users). For example, a black list identifies identities of users/devices/applications/services to which an organization should not access (e.g., via an SaaS platform). If an event indicates that an access was made to an entity that is on a black list, then a prescribed security action can be performed.

Prescribed configurations. A prescribed configuration is a setting that should be set at an SaaS platform. For example, a prescribed configuration could be that multi-factor authentication should be turned on for all users of an organization at a particular SaaS platform. If the prescribed configuration is not detected at the SaaS platform, then a prescribed security action can be performed.

Figure 5:
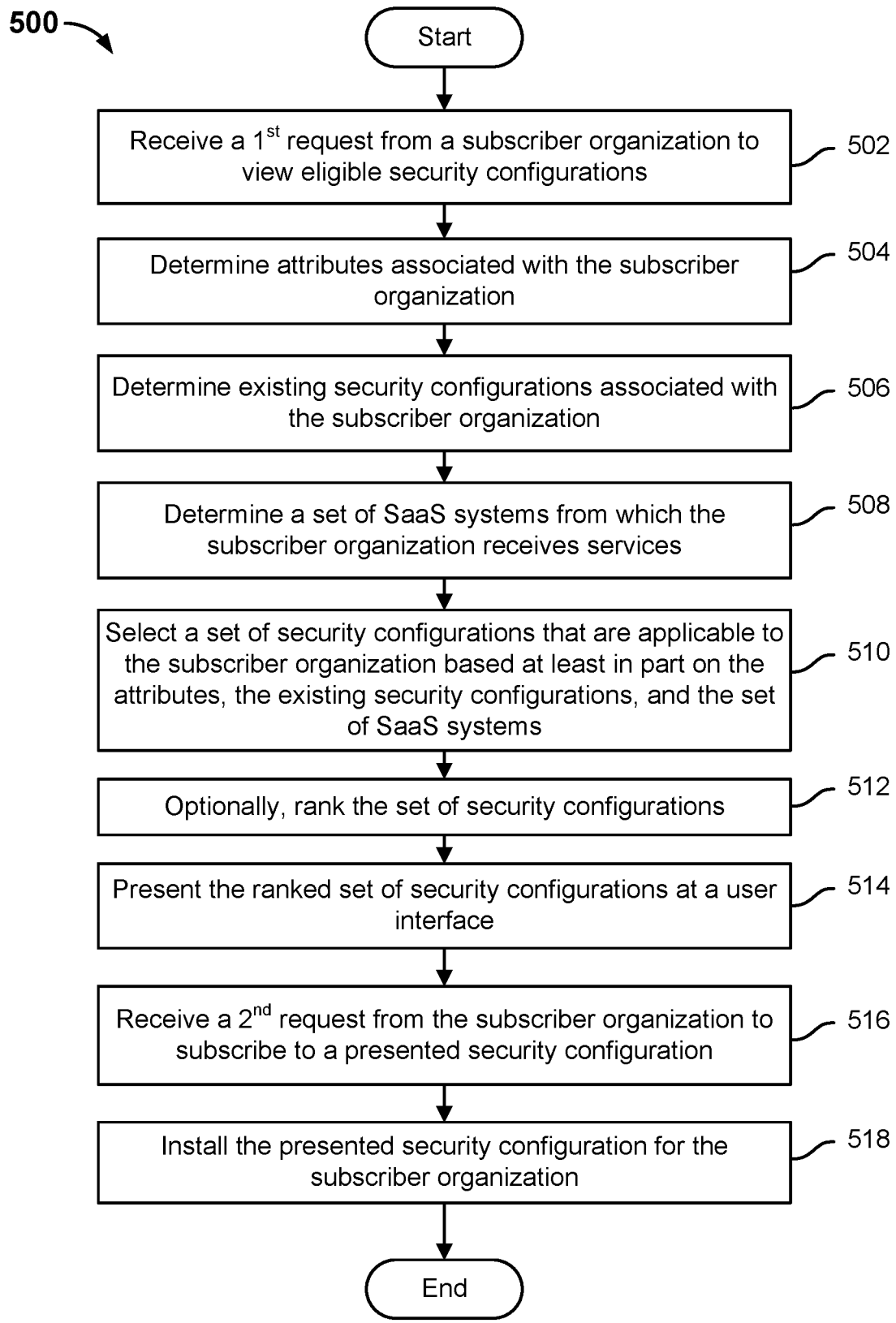
FIG. 5 is a flow diagram showing an example of a process for providing a presentation of eligible security configurations to a requesting organization in accordance with some embodiments.

FIG. 5 is a flow diagram showing an example of a process for providing a presentation of eligible security configurations to a requesting organization in accordance with some embodiments. In some embodiments, process 500 is implemented at security configurations management server 108 of system 100 of FIG. 1.

Process 500 describes an example process of determining published security configurations that are applicable/relevant to an organization. After receiving a presentation of such security configurations, the organization can select to subscribe to at least one of such security configurations.

At 502, a first request is received from a subscriber organization to view eligible security configurations. A user associated with a subscriber organization may log into a website or an application that is provided by the security configurations management server and make a selection to browse published security configurations that are applicable to the subscriber organization.

At 504, attributes associated with the subscriber organization are determined. Examples associated with the subscriber organization may include, but are not limited to: the industry of the organization, the language setting(s) that are set for the organization, legal standards with which the organization must comply, and which software or product licenses the organization currently has.

At 506, existing security configurations associated with the subscriber organization are determined. The security configurations that have been configured by the subscriber organization itself or already subscribed to by the subscriber organization are determined.

At 508, a set of SaaS systems from which the subscriber organization receives services is determined. The SaaS platforms that the subscriber organization subscribes services from and/or against which the existing security configurations are enforced are determined.

At 510, a set of security configurations that are applicable to the subscriber organization is selected based at least in part on the attributes, the existing security configurations, and the set of SaaS systems. The pool of published security configurations (e.g., that have been published/shared by other organizations and/or obtained from trusted partners) are evaluated against the attributes, the existing security configurations, and the set of SaaS systems associated with the subscriber organization. In some embodiments, the published security configuration and their respective publication parameters can be compared against the attributes, the existing security configurations, and the set of SaaS systems associated with the subscriber organization to select a subset of the published security configurations that will be presented at a user interface for the subscriber organization. For example, published security configurations that are not applicable to the SaaS systems from which the subscriber organization subscribes services will not be presented at the user interface. Furthermore, published security configurations that have different language settings and/or are associated with different industries than those associated with the subscriber organization will also be excluded from being presented at the user interface. Published security configurations that are redundant or in conflict with any existing security configurations that have already been adopted by the subscriber organization can also be excluded from being presented at the user interface. Any remaining published security configurations that include at least a portion of a security configuration that is applicable to the subscriber organization is determined to be presented at the user interface. For example, if the security configuration includes a set of detection rules and at least one of such detection rules was relevant to the subscriber organization but at least another detection rule was not relevant to the subscriber organization, then the security configuration can still be presented at the user interface.

At 512, optionally, the set of security configurations is ranked. The security configurations that are to be presented at the user interface can be, optionally, ranked prior to being presented. In some embodiments, the security configurations can be ranked according to one or more of the following factors: whether the subscriber organization had previously subscribed to any security configurations that were published by a publisher of a security configuration, the rating associated with the publisher of a security configuration, and the analytics (e.g., benchmarking, velocity) associated with the publisher of a security configuration.

At 514, the ranked set of security configurations is presented at a user interface. The selected security configurations can be sent to and presented at a device that is used by a user associated with the subscriber organization. In some embodiments, any information that is presented with each selected security configuration is determined based on its publication parameters. As mentioned above, the publication parameters may indicate whether the publisher of the security configuration should be identified or anonymized, whether subscription to the security configuration will cost money, and analytics (e.g., the number of other organizations that have subscribed to the security configuration, the number of times that the security configuration has been triggered across subscriber organizations) associated with the security configuration.

At 516, a second request is received from the subscriber organization to subscribe to a selected security configuration.

At 518, the selected security configuration is installed for the subscriber organization. In response to a received selection by a user of the subscriber organization of a security configuration that is presented at the user interface, an instance of the security configuration is installed for the subscriber organization and then enforced for that subscriber organization with respect to that subscriber organization's data stored at and/or events received from an SaaS system that is specified in the security configuration.

Figure 6:
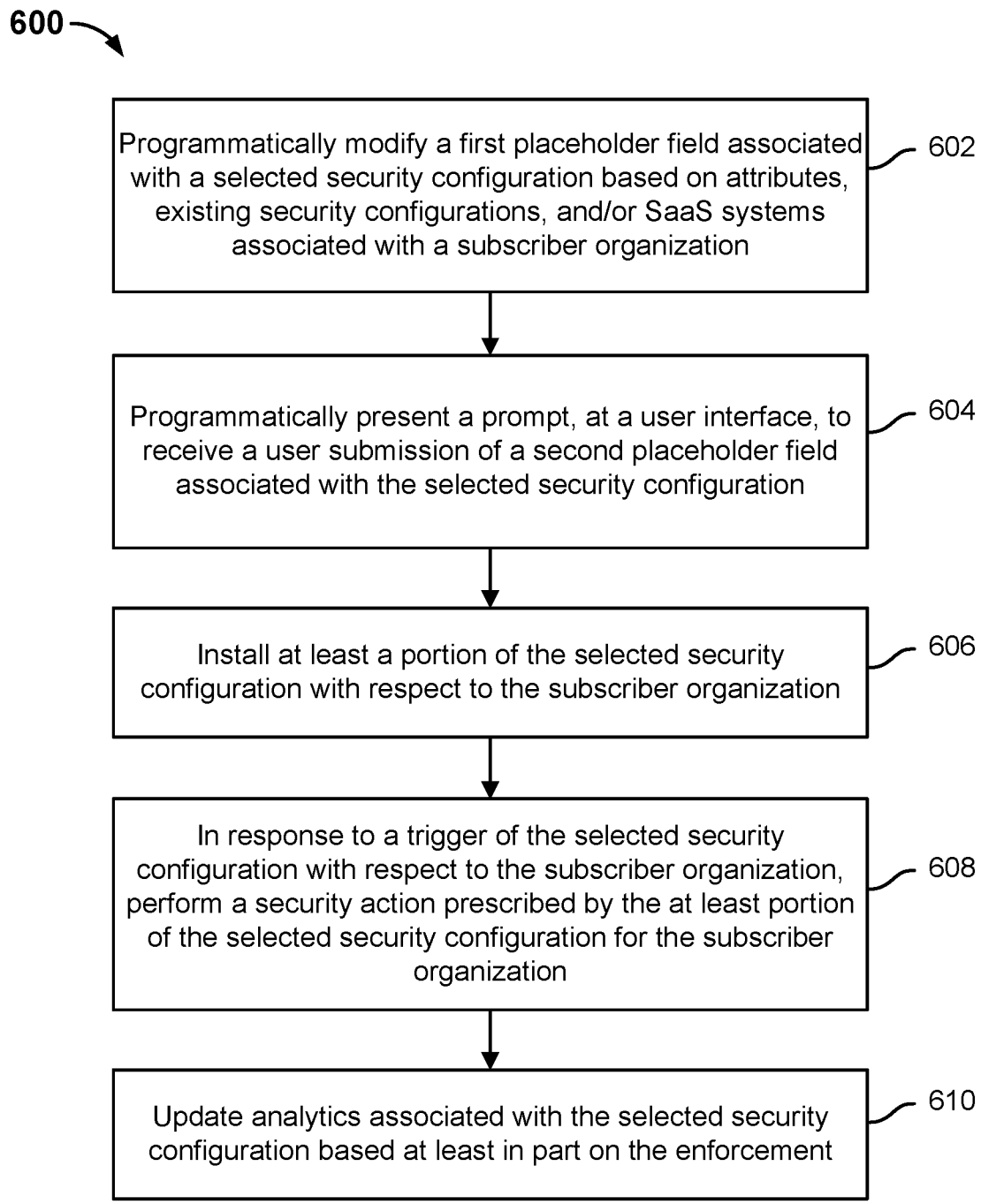
FIG. 6 is a flow diagram showing an example of a process for implementing a security configuration that has been selected by a subscriber organization in accordance with some embodiments.

FIG. 6 is a flow diagram showing an example of a process for implementing a security configuration that has been selected by a subscriber organization in accordance with some embodiments. In some embodiments, process 600 is implemented at security configurations management server 108 of system 100 of FIG. 1. In some embodiments, step 518 of process 500 of FIG. 5 is implemented at least in part using process 600.

At 602, a first placeholder field associated with a selected security configuration is programmatically modified based on attributes, existing security configurations, and/or SaaS systems associated with a subscriber organization. If the security configuration that has been selected to subscribe to by the subscriber organization includes a placeholder field that can be programmatically customized/updated, then the attributes, existing security configurations, and/or SaaS systems associated with a subscriber organization are used to determine a customized value for this field. For example, the placeholder field may include metadata that describes a type of data and/or a location of data to which the placeholder field is to reference. In a specific example, a placeholder field may include a mapping to a prescribed type of list associated with an organization. This placeholder field could then be customized for the subscriber organization to map to the prescribed type of list (metadata) that is specific to the subscriber organization.

At 604, a prompt to receive a user submission of a second placeholder field associated with the selected security configuration is programmatically presented at a user interface. If a placeholder field cannot be programmatically customized for the subscriber organization and it is associated with metadata that indicates that the subscriber organization would need to manually update the field, then a prompt can be presented at a user interface for a user of the subscriber organization to ask the user to manually customize the field with a value that is specific to the subscriber organization.

At 606, at least a portion of the selected security configuration is installed with respect to the subscriber organization. The at least portion of the selected security configuration that is relevant to the subscriber organization (e.g., relates to an SaaS platform to which the subscriber organization subscribes, includes a user role that is recognized by the subscriber organization) is installed by, for example, executing a code snippet that will cause the at least portion of the selected security configuration to be enforced.

At 608, in response to a trigger of the selected security configuration with respect to the subscriber organization, a security action prescribed by the at least portion of the selected security configuration is performed for the subscriber organization. After the selected security configuration is installed, the condition(s) specified in the selected security configuration are periodically compared against the stored data at a specified SaaS system and/or compared against normalized versions of events that are received from the specified SaaS system. In the event that the selected security configuration is triggered (e.g., a condition described therein is met), then a security action that is prescribed by the selected security configuration is performed. Examples of performing a security action include presenting an alert at a user interface, showing the discrepancies between prescribed settings at an SaaS system and actual settings at the SaaS system, and executing a code snippet that is configured to make one or more API calls to a specified SaaS system to update a stored data value/setting (e.g., turn on multi-factor authentication, change a user's permission, suspend a user's account, block a user) at the SaaS system.

At 610, analytics associated with the selected security configuration are updated based at least in part on the enforcement. Information around the trigger of the selected security configuration (e.g., when the selected security configuration was triggered, the events that triggered the selected security configuration) can be determined and stored.

Figure 7:
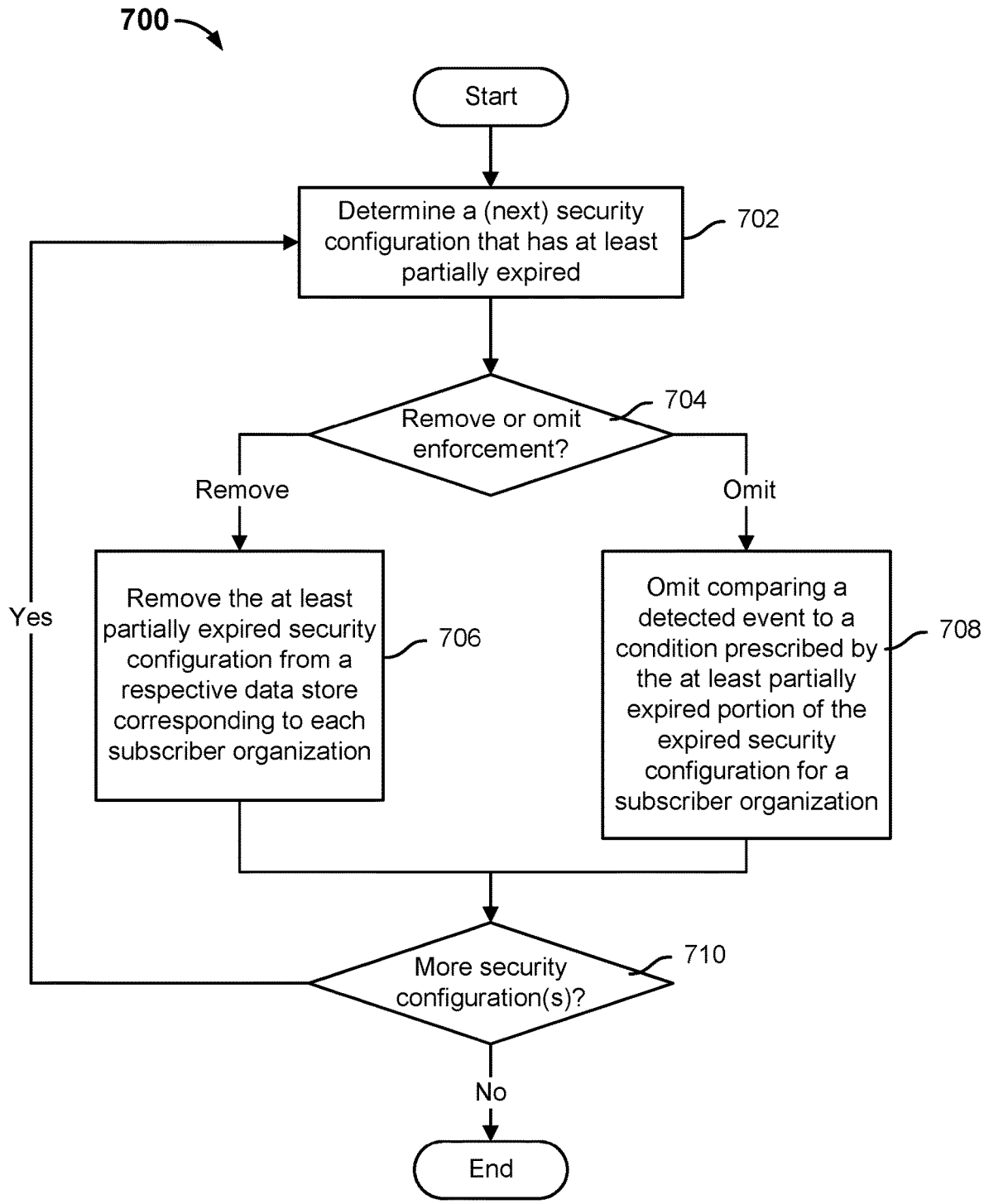
FIG. 7 is a flow diagram showing an example of a process for handling at least partially expired security configurations in accordance with some embodiments.

FIG. 7 is a flow diagram showing an example of a process for handling at least partially expired security configurations in accordance with some embodiments. In some embodiments, process 700 is implemented at security configurations management server 108 of system 100 of FIG. 1.

Process 700 describes an example process for handling security configurations that have at least partially expired or are at least partially deprecated in response to an event.

At 702, a (next) security configuration that has at least partially expired is determined. A security configuration can expire in part or entirely. In a first example, a security configuration may be generated with an expiration date associated with at least a portion of the security configuration. After that expiration date passes, then the corresponding at least portion of the security configuration is considered to be expired. In a second example, at least a portion of the security configuration can expire if the security configuration is to be enforced against data values stored at and/or events received from a version of an SaaS platform that have been deprecated. In a third example, at least a portion of the security configuration can expire if that portion refers to a feature of an SaaS platform that has been deprecated. In a fourth example, at least a portion of the security configuration can expire if an updated version of that security configuration is published by its publisher to replace the older version.

At 704, whether the at least partially expired security configuration is to be removed or omitted from enforcement is determined. In the event that the at least partially expired security configuration is to be removed, control is transferred to 706. Otherwise, in the event that the at least partially expired security configuration is to be omitted from enforcement, control is transferred to 708. Whether the at least partially expired security configuration is to be removed or no longer enforced for its subscriber organizations can be determined based on the publication parameters of the expired security configuration that were configured by the publisher of the expired security configuration or a stored preference of the subscriber organization.

At 706, the at least partially expired security configuration is removed from a respective data store corresponding to each subscriber organization. The at least partially expired security configuration can either be deleted from or marked for deletion at the respective data store corresponding to each subscriber organization that had subscribed to the security configuration.

At 708, a detected event is omitted from being compared to a condition prescribed by the at least partially expired portion of the expired security configuration for a subscriber organization. The at least partially expired portion of the security configuration can simply no longer be enforced. For example, the conditions prescribed by the expired at least portion of the security configuration no longer need to be periodically compared against the stored values at or events received from a corresponding SaaS platform.

At 710, whether there is at least one more security configuration to be evaluated is determined. In the event that there is at least one more security configuration to be evaluated, control is returned to 702. Otherwise, in the event that there are no more security configurations to be evaluated, process 700 ends.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
one or more memories; and
one or more processors coupled to the one or more memories and configured to:
provide first software as a service (SaaS) security configurations for a first organization that are applicable to the first organization based at least in part on first attributes of the first organization, wherein the first SaaS security configurations trigger first security actions upon detection of first relevant events;
provide second SaaS security configurations for a second organization that are applicable to the second organization based at least in part on second attributes of the second organization, wherein the second SaaS security configurations trigger second security actions upon detection of second relevant events;
receive a request to publish the second SaaS security configurations;
compare the second SaaS security configurations to the first attributes of the first organization to determine a first portion of the second SaaS security configurations that is applicable to the first organization and a second portion of the second SaaS security configurations that is not applicable to the first organization;
present, at a user interface, the first portion of the second SaaS security configurations that is applicable to the first organization;
omit from presenting at the user interface, the second portion of the second SaaS security configurations that is not applicable to the first organization;
receive, via the user interface, a request to subscribe to a selected second SaaS security configuration for the first organization; and
programmatically customize a placeholder field associated with the selected second SaaS security configuration to a first organization-specific data value.

2. The system of claim 1, wherein the one or more processors are further configured to receive a request associated with the first organization to browse published SaaS security configurations.

3. The system of claim 1, wherein the one or more processors are further configured to:
receive publisher identification information associated with the second SaaS security configurations;
receive publication parameters associated with the second SaaS security configurations; and
store the publication identification information and publication parameters associated with the second SaaS security configurations.

4. The system of claim 3, wherein the one or more processors are further configured to present the first portion of the second SaaS security configurations at the user interface with information that is determined based at least in part on the publication parameters.

5. The system of claim 1, wherein the one or more processors are further configured to determine that the first portion of the second SaaS security configurations is applicable to the first organization based on the first portion of the second SaaS security configurations specifying SaaS platforms from which the first organization subscribes services.

6. The system of claim 1, wherein the one or more processors are further configured to determine that the first portion of the second SaaS security configurations is applicable to the first organization based on the first organization having appropriate licenses.

7. The system of claim 1,
wherein the placeholder field associated with the selected second SaaS security configuration is programmatically customized to the first organization-specific data value based at least in part on the first attributes, existing security configurations, and SaaS platforms from which the first organization subscribes services.

8. The system of claim 1, wherein the user interface comprises a first user interface, wherein the placeholder field comprises a first placeholder field, and wherein the one or more processors are further configured to:
programmatically present a prompt, at a second user interface, to receive a user submission of a second placeholder field associated with the selected second SaaS security configuration.

9. The system of claim 1, wherein the user interface comprises a first user interface, and wherein the one or more processors are further configured to:
in response to a trigger of the selected second SaaS security configuration with respect to the first organization, perform a security action triggered by the selected second SaaS security configuration for the first organization; and
update stored analytics associated with the selected second SaaS security configuration with respect to the first organization based at least in part on the trigger.

10. The system of claim 9, wherein the security action comprises one or more of the following: presenting an alert, displaying a detected discrepancy, and sending an application programming interface (API) call to an SaaS platform to update a data value or setting.

11. The system of claim 9, wherein the one or more processors are further configured to determine the trigger of the selected second SaaS security configuration with respect to the first organization by determining that a data value stored at an SaaS platform specified by the selected second SaaS security configuration or an event received from the SaaS platform meets a condition of the selected second SaaS security configuration.

12. The system of claim 1, wherein the one or more processors are further configured to:
determine that at least a portion of a second SaaS security configuration has expired; and
in response to the determination, remove the second SaaS security configuration from a data store associated with the second organization or omit enforcing the second SaaS security configuration for the second organization.

13. The system of claim 1, wherein the second SaaS security configurations comprise one or more of the following: a policy, a managed list, a detection rule, and a prescribed setting.

14. A method, comprising:
providing first software as a service (SaaS) security configurations for a first organization that are applicable to the first organization based at least in part on first attributes of the first organization, wherein the first SaaS security configurations trigger first security actions upon detection of first relevant events;
providing second SaaS security configurations for a second organization that are applicable to the second organization based at least in part on second attributes of the second organization, wherein the second SaaS security configurations trigger second security actions upon detection of second relevant events;
receiving a request to publish the second SaaS security configurations;
comparing the second SaaS security configurations to the first attributes of the first organization to determine a first portion of the second SaaS security configurations that is applicable to the first organization and a second portion of the second SaaS security configurations that is not applicable to the first organization;
selectively presenting, at a user interface, the first portion of the second SaaS security configurations that is applicable to the first organization
omitting from presenting at the user interface, the second portion of the second SaaS security configurations that is not applicable to the first organization;
receiving, via the user interface, a request to subscribe to a selected second SaaS security configuration for the first organization; and
programmatically customizing a placeholder field associated with the selected second SaaS security configuration to a first organization-specific data value.

15. The method of claim 14, further comprising receiving a request associated with the first organization to browse published SaaS security configurations.

16. The method of claim 14, further comprising:
receiving publisher identification information associated with the second SaaS security configurations;
receiving publication parameters associated with the second SaaS security configurations; and
storing the publication identification information and publication parameters associated with the second SaaS security configurations.

17. The method of claim 16, further comprising presenting the first portion of the second SaaS security configurations at the user interface with information that is determined based at least in part on the publication parameters.

18. The method of claim 14, further comprising determining that the first portion of the second SaaS security configurations is applicable to the first organization based on the at least portion of the second SaaS security configurations specifying SaaS platforms from which the first organization subscribes services.

19. The method of claim 14, further comprising determining that the first portion of the second SaaS security configurations is applicable to the first organization based on the first organization having appropriate licenses.

20. A computer program product, the computer program product excluding intangible media and including a non-transitory computer readable storage medium, and comprising computer instructions for:
providing first software as a service (SaaS) security configurations for a first organization that are applicable to the first organization based at least in part on first attributes of the first organization, wherein the first SaaS security configurations trigger first security actions upon detection of first relevant events;
providing second SaaS security configurations for a second organization that are applicable to the second organization based at least in part on second attributes of the second organization, wherein the second SaaS security configurations trigger second security actions upon detection of second relevant events;
receiving a request to publish the second SaaS security configurations;
comparing the second SaaS security configurations to the first attributes of the first organization to determine a first portion of the second SaaS security configurations that is applicable to the first organization and a second portion of the second SaaS security configurations that is not applicable to the first organization;
selectively presenting, at a user interface, the first portion of the second SaaS security configurations that is applicable to the first organization;
omitting from presenting at the user interface, the second portion of the second SaaS security configurations that is not applicable to the first organization;
receiving, via the user interface, a request to subscribe to a selected second SaaS security configuration for the first organization; and
programmatically customizing a placeholder field associated with the selected second SaaS security configuration to a first organization-specific data value.

\* \* \* \* \*